United States Patent [19]

Jourjine

[11] Patent Number: 4,967,369
[45] Date of Patent: Oct. 30, 1990

[54] VARIABLE CAPACITY TRANSMISSION MEDIUM

[76] Inventor: Alexander N. Jourjine, P.O. Box 425, Cambridge, Mass. 02142

[21] Appl. No.: 203,414

[22] Filed: Jun. 7, 1988

[51] Int. Cl.$^5$ .............................................. G06F 15/18
[52] U.S. Cl. ..................................... 364/513; 364/807
[58] Field of Search ...................... 364/513, 200, 274.9, 364/276.6, 148, 807; 382/14, 15; 307/201

[56] References Cited

U.S. PATENT DOCUMENTS

| | | | |
|---|---|---|---|
| 4,660,166 | 4/1987 | Hopfield | 364/807 |
| 4,747,069 | 5/1988 | Grinberg et al. | 364/807 |
| 4,802,103 | 1/1989 | Faggin et al. | 364/513 |
| 4,807,168 | 2/1989 | Moopenn et al. | 364/800 |
| 4,858,147 | 8/1989 | Conwell | 364/513 |
| 4,862,406 | 8/1989 | Fisher | 364/807 |

OTHER PUBLICATIONS

Yu. V. Prohorov and Yu. A. Rozanov, *Probability Theory*, Springer-Verlag Berlin, Heidelberg, 1969, 310.
N. H. Farhat et al., "Bimodal Stochastic Optical Leaning Machine," DARPA Neural Network Study, Oct. 87–Feb. 88, Part II, pp. 365–372.
Linsker, Ralph, "Self-Organization in a Perceptual Network," *Computer*, Mar. 1988, pp. 105–117.

*Primary Examiner*—Allen MacDonald
*Attorney, Agent, or Firm*—Hamilton, Brook, Smith & Reynolds

[57] ABSTRACT

Methods of information correlation based on extremization of transmission capacity of an assembly of information processors are disclosed. In one embodiment, an assembly of processors exchanging information through the exchange of random codes serves as a correlator between two inputs adjusting its total communication capacity to achieve maximum correlation between two inputs.

6 Claims, 7 Drawing Sheets

VARIABLE CAPACITY TRANSMISSION MEDIUM

TECHNICAL FIELD

This invention relates to methods of weight adjustment for neural networks. The invention has a particular application in feature extraction devices in the general area of pattern recognition for feature information discrimination in analog inputs.

BACKGROUND

Neural networks may be defined as dynamical systems defined on networks of processors, where processors serve as vertices of the networks and processor pairs exchanging information serve as links. The dynamical state of a neural network composed of processors P is generally described by quantities Fp(t), P=1, 2, ..., N, called activations, which account for the level of activation of processors and by quantities Dpq(t), p,q=1, 2, ... N, called weights, which account for the degree of the information exchange among pairs of processors. It is assumed that learning in neural networks can be described by adjustment of weights which may be slow compared to adjustment of activations.

Applications of neural networks to pattern recognition require neural networks to discriminate input information with regard to presence or absence of certain features. One of the most important unsolved problems in pattern recognition both within neural network approach and other approaches, such as Artificial Intelligence, is automatic feature extraction.

Various methods are known in the prior art for feature extraction and pattern recognition. One method, known as error back propagation, involves minimization of error functional which is the sum over squared differences between the desired and actual outputs of the output processors. The disadvantages of this method include inability to prove convergence to global extremum and slowness of the convergence due to the fact that the error functional is global, i.e, it is a very complicated expression where each term of the sum depends on the activations and the weights of all or large part of the neural network which, in its turn, makes it very difficult to build hardware implementations of the method. In addition this method requires the knowledge of the desired output. Another means to implement pattern recognition through neural networks known in the art as the adaptive resonance model involves judicious choice of rates of adjustment of weights so that the rates would resemble physiology of the brain. The obvious disadvantage of this method is arbitrariness in the choice of the rates and lack of predicatability of the behavior of the model and difficulty with hardware implementations since the method is presented as a set of abstract differential equations. Methods and apparatus for information processing using analog characteristics of inputs were described in prior patent application Ser. Nos. 026,479 filed 03/16/87 and 113,636 filed 10/27/87.

DISCLOSURE OF THE INVENTION

Therefore, there exists a need for methods of feature extraction and information discrimination which are based on extremization of local functionals such that the functionals are represented in terms of parameters of physical processes such as energy or information contained in the inputs.

Transmission medium comprises input/output cells and Information Transmission Cells (ITC) each of which comprises memory cells, and transmission cells. Cells are generally comprises of Random Code Neural Network (RCNN) processors P, P=1, 2, ..., N, whose output is proportional to a binary valued piece-wise constant function Dp(t) whose discontinuities occur at times equal to integer multiples of the inverse of base frequency fo, so that the activation Fp of P's processor of RCNN is given by $$Fp = :Dp(t): = (1/T) \int_{t-T}^{t} dt' Dp(t')$$

where T is a multiple of Tc, called the code length, and the weight Dpq for a pair of processors P, Q is $$Dpq = :Dp(t)Dq(t):/(:Dp(t)::Dp(t):).$$

Codes Dp(t) can have non-zero values only within windows of length Tp, called pulse length, within code length Tc, Tp < Tc. The activation timing Tp(t) denotes the time between the beginning of the code length and the pulse length cycles. Within the pulse length windows, codes are represented by random binary numbers. Weights Dpq may be written down as $$Dpq = (Tc/Tp^2)(Tp - abs(tp - tq))\; tp - tq < Tp$$

$$Dpq = 0 \; tp - tq > Tp$$

where abs(tp−tq) is the absolute value of tp−tq. For every pair P,Q of process, exchanging information in the form of random codes Dp(t) and Dq(t), weight Dpq(t) is identical to the transmission capacity of the communication channel between P and Q. In addition, weight Dpq(t) is proportional to the total energy throughput capacity through said channel.

In one embodiment transmission medium comprises a physical assembly of Input/Output processors; a Random Code Generator which may be a pseudorandom generator implemented by a computer routine; an assembly of Information Transmission Cells (ITC); a bolometer or any such device or means for measurement of transmission capacity by said ITC assembly; a plurality of random code stream interconnections; and a plurality of information exchange channels, where each ITC comprises a transmission cell and a memory cell. In other embodiments said processors, and said cells exist as memory locations in a digital computer.

In one embodiment of the present invention, a variable capacity transmission medium is trained by being subjected to two inputs coming from the opposite ends A and B of a generally two-dimensional array of ITCs. Training is completed after the maximum total information transmission between sides A and B is achieved, which is reflected in the maximum overall heat emission by the transmission medium as measured by said bolometer. Information discrimination occurs when one of the inputs (B) is changed: for significant changes total transmission decreases by a large factor compared to its original value.

Various other features of the method of the present invention will become obvious to those skilled in the art upon reading the disclosure set forth hereinafter.

BRIEF DESCRIPTION OF THE DRAWINGS

The foregoing and other objects, features and advantages of the invention will be apparent from the following more particular description of the preferred embodiment of the invention, as illustrated in the accompanying drawings in which like reference characters refer to the same parts throughout different views. The drawings are not necessarily to the scale, emphasis instead is placed upon the principles of the invention.

DETAILED DESCRIPTION OF THE PREFERRED EMBODIMENT

Figure 1:
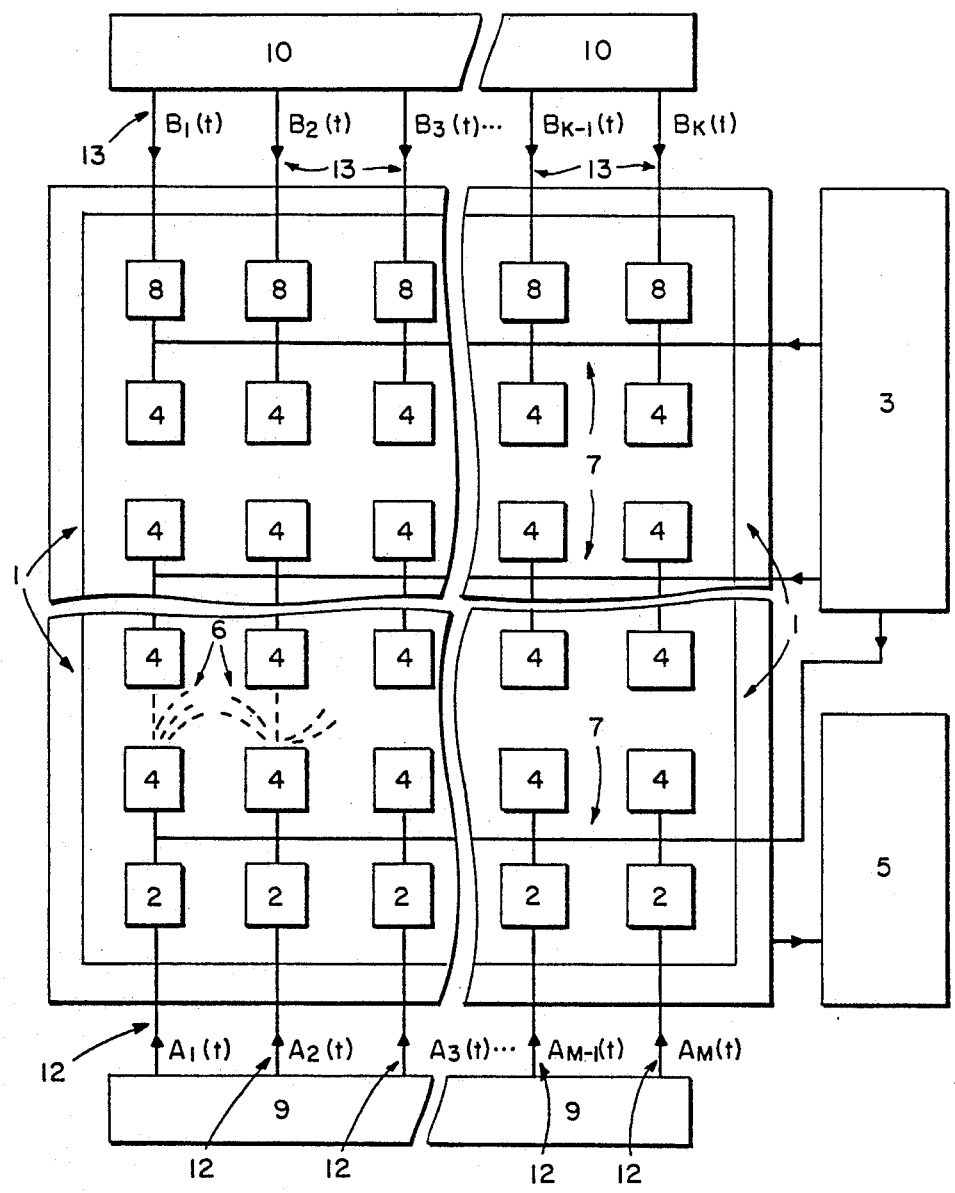
FIG. 1 is a block-diagram of a variable capacity transmission medium.

Referring now to FIG. 1 a part of an assembly of processors embodying variable capacity transmission medium is shown. The assembly comprises Input/Output (I/O) processors 2 on side A of said assembly; I/O processors 8 on side B of said assembly; and Information Transmission Cells 4, all situated on a common substrate 1. I/O processors and ITCs can emit information to and absorb information from their nearest neighbors in the form of random codes Dp(t). I/O processors and ITCs are connected through an array of common pipelines 7 to the Random Code Generator 3. Random code generator 3 emits with a base frequency fo a stream of random signals proportional to binary numbers $R(t)=0, 1$; said numbers produced by an equivalent of a sequence of independent coin tosses. Said stream R(t) is accessed through pipeline connections 7 to I/O processors and ITCs of the Information Transmission Medium.

The number of the nearest neighbors for each said processor or cell is determined by said processors and said cells fanouts 6. In this particular embodiment of the present invention each said processor broadcasts its signal to its nearest neighbors through a common for said nearest neighbors channel of communication. In another embodiment each pair of processors has a separate channel of communication.

Two inputs f(t) and h(t) are preprocessed by two banks 9 and 10 of bandpass filters with each groups's members in one-to-one correspondence with the members of the I/O processors 2 and I/O 8 processors correspondingly to effect decomposition $$f(z) = SUMq[Aq(t)Vq(t)]$$

$$h(z) = SUMr[Br(t)V'r(t)]$$

where the first summation denoted by SUMq is over I/O processors 2 and the second summation is over I/O processors 8. Each group of filter functions Vq(t) and V'r(t) form an overcomplete set of functions on some Hilbert space. This is advantageous for retaining the information about correlations within the input signals f(z) and, separately, h(z). For each q in said sum over q the filter response function Aq(t) is the input of the I/O processor 2 through connection 12. For each r in said sum over r the filter response function Br(t) is the input of the I/O processor 8 through connection 13.

The total heat transfer per second H(t) by said assembly of I/O processors and ITCs through the common substrate 1 is measured by bolometer 5. Bolometer 5 serves as the indicator of the speed (Kn) of the learning process through the definition $$Kn = d/dtH(t).$$

Figure 2:
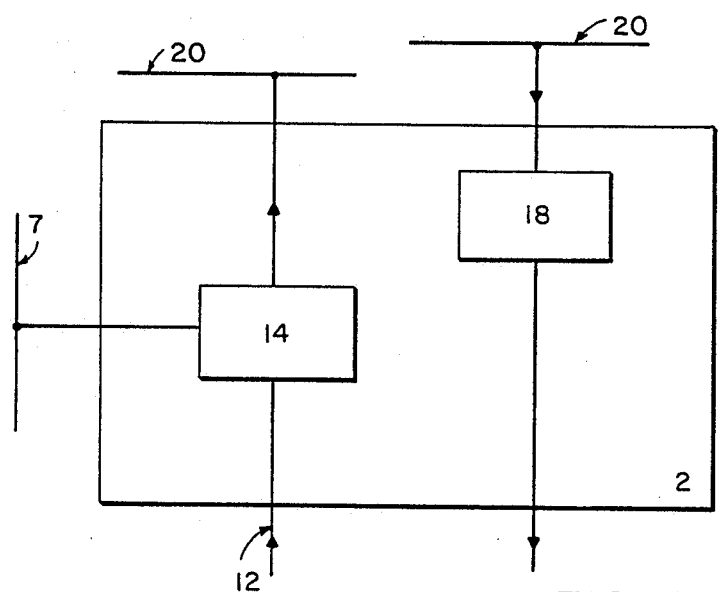
FIG. 2 is a block-diagram of an Input/Output cell.

Referring now to FIG. 2 a block-diagram of an I/O processor 2 is shown. I/O processors 8 are identical in design to I/O processors 2 and same block-diagram on FIG. 2 applies to their function. External input Ar(t) from filter array 9 enters I/O processor 2 through a connector 12. Ar(t) is an input of delay unit 14. Second input in delay unit 14 is random stream $R(r) = R(t+t'(r))$ from Random Code Generator 3, where the delay t'(r) is $$t'(r) = S(r)/c,$$

where S(r) is the distance of said I/O processor to the Random Code Generator 3, and c is the speed of said random stream signal propagation. Upon the reception of value one in said random stream, delay unit 14 emits a signal of constant amplitude of the form used in communication among I/O processors and ITCs. In this particular embodiment of the present invention the form of communication is electronic. In other embodiment said form of communication is optical. In yet other embodiment said form of communication is acoustic. Said signal is emitted with a time delay t''(r) which consists of two parts $$t''(r) = T(r) + [1/(foAr(t))]$$

where $$T(r) = m/fo$$

and m is a constant number assigned randomly from a set of natural numbers 0, 1, ..., Ms such that Ms::Nr, where Nr is the number of the nearest neighbors of processor R. Such assignment of constant time delays T(r) ensures that each processor or cell R will effectively access a random binary stream $R(t+t'+T(r))$ which is statistically independent from the random stream of the most of its nearest neighbors. This is advantageous because it eliminates the need to have a separate random code generator for each processor or cell. Instead only one random code generator is needed. The output of delay unit 14 is emitted into a communication channel 20 which is common for nearest neighbors of processor 2. The second summand in the expression for time delay t''(r) ensures that the average energy Er(t) emitted per second by processor 2 into the channel 20 is $$Er(t) = kAr(t)$$

where k is a coefficient of proportionality which is the same for all I/O processors 2.

From common communication channel 20 processor 2 receives input Lr(t) in the form of the sum of attenuated emissions from the nearest neighbor ITCs $$Lr(t) = k' \text{SUM} p[TrpDp(t)],$$

where k' is a coefficient of proportionality, Trp are constant attenuation parameters 0<Trp<1, and Dp(t) are binary valued piece-wise constant random code functions proportional to the amplitudes of emissions of signals by ITCs 4. Input Lr(t) is averaged by integrator 18 whose output is $$Or(t) = :Lr(t):.$$

Figure 3:
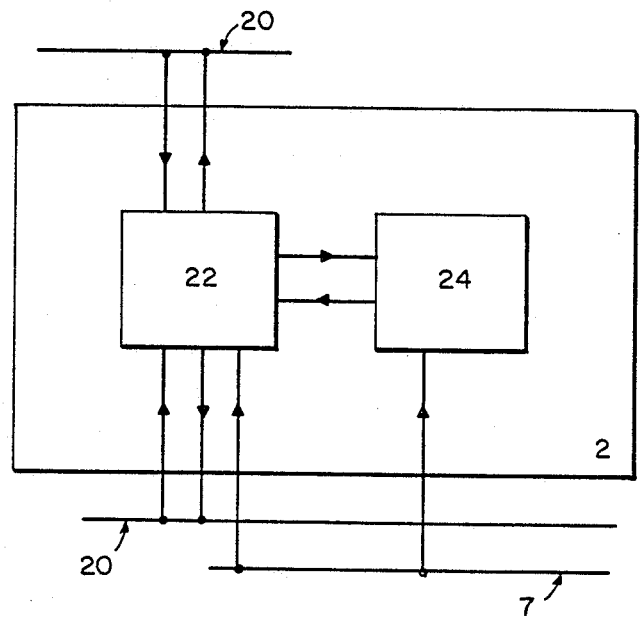
FIG. 3 is a block-diagram of an Information Discrimination Cell.

Referring now to FIG. 3 a block-diagram of Information Transmission Cell 4 is shown. Directed lines depict the flows of exchange of random binary codes. The input of transmission cell 22 comprises inputs from common communication channels 20, from memory cell 24 and from Random Code Generator 3. The input into memory cell 24 comprises random code Dt(t) of transmission cell 22 and random stream from Random Code Generator 3.

Figure 4:
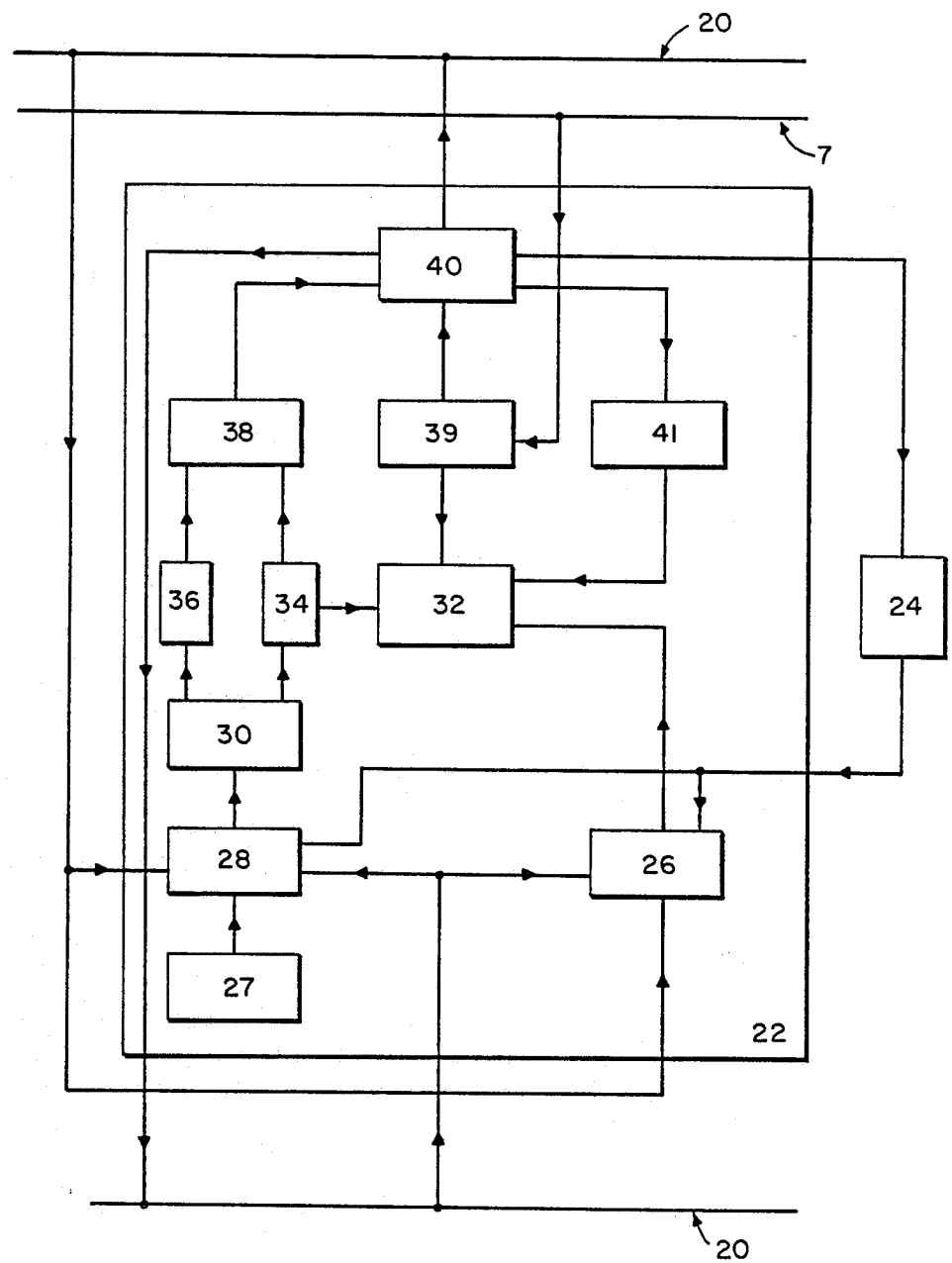
FIG. 4 is a block-diagram of a transmission cell.

Referring now to FIG. 4 a block-diagram of transmission cell 22 is shown. The design of the memory cell 24 is like the design of the transmission cell 22. The difference between cell 24 and cell 22 is in communication pattern and in certain constant parameters. Transmission cell 22 comprises integrators 26, 41; bolometers 34, 36; adder 38; switches 28, 30, 40; activation update unit 32; and delay units 27, 39. External information input Lt(t) into the transmission cell 22 comes from common communication channels 20. Said input can be represented as $$Lt(t) = La(t) + Lb(t) + TtmDm(t)$$

where La(t) is the input coming from the general direction of side A of substrate 1 of FIG. 1; Lb(t) is the input coming from the general direction of side B of said substrate; and Dm(t) is the output of memory cell 24 of FIG. 3 of the corresponding ITC. Constant Ttm is the numerical attenuation coefficient for the information signal propagation from memory cell to transmission cell of the same ITC. Due to relative proximity of said memory cell 24 to transmission cell 22, the constant Ttm is close to one.

The input Lt(t) undergoes effective multiplication by the output function Dt(t) of switch 40. Said function is the input of delay unit 27 which delays propagation of code pulses from switch 40 to switch 28 for time (s/fo) during odd time intervals from (nTc) to (n+1)Tc for n odd and does not delay said propagation during even time intervals when n is even, where s is some integer number. Switch 28 opens and closes access of switch 30 to the common communication channels 20 during the time when the corresponding random code is one or zero, respectively. Neglecting time of propagation from switch 40 to switch 27, during said odd time intervals said code is Dt(t−s/fo); and during said even time intervals said code is Dt(t).

The input of switch 30 is proportional to the energy flux from the channel 20 multiplied by either Dt(t−s/fo) or Dt(t). Switch 30 directs all output of switch 28 with uniform frequency fo, the base clock frequency, to bolometer 36 during odd time intervals from (nTc) to (n+1)Tc for n odd and to bolometer 34 during even time intervals when n is even. The ouputs of bolometers 36 and 34 are proportional to the average of the received inputs over the period of time Tb=mTc, where m is some large number. These outputs are related to the total energy absorbed by switch 28 during either odd or even intervals of code length Tc. The output of bolometer 34 is the signal proportional to the average energy flux :E: into bolometer 34

$$:E: = :Dt(t)Lt(t):$$

where the average is over said time period Tb. The output of bolometer 36 is the signal proportional to the average energy flux :E: into bolometer 36

$$:E: = :Dt(t - s/fo)Lt(t):$$

where the average is over said time period Tb.

Adder 38 subtracts the output of bolometer 36 from output of bolometer 34. The output Na(t) of adder 38 is $$Na(t) = Va[:(Dt(t) - Dt(t - s/fo))Lt(t):],$$

where Va is a positive integer, called learning slope. The net effect of timing updating is implementation of the steepest ascent method for finding the extremum of the functional $$Tr = \text{SUM} q[:Lt(t)Dt(t):],$$

where the sum is over all nearest neighbors of transmission cell 22, i.e. all processors or cells which communicate with said transmission cell directly.

The output of adder 38 is the input of switch 40. It determines update of timing delay ti(t) of switch 40. Switch 40 prevents emission of random stream from the delay unit 39 into common communication channel 20 during even time intervals from (jTc) to (jTc+ti(t)), allows said emission during intervals from (jTc+ti(t)) to (jTc+ti(t)+Tp), and blocks said emission during intervals from (jTc+ti(t)+Tp) to ((j+1)Tc), when j is even. Switch 40 opens prevents emission of random stream from the delay unit 39 into common communication channel 20 during even time intervals from (jTc) to (jTc+ti(t)+s/fo), allows said emission during intervals from (jTc+ti(t)+s/fo) to (jTc+ti(t)+s/fo+Tp), and blocks said emission during intervals from (jTc+ti(t)+s/fo+Tp) to ((j+1)Tc), when j is odd.

Random stream from Random Code Generator 3 is accessed by the delay unit 39 which, upon arrival of a positive value of said random stream generates a unit pulse of duration 1/fo with a delay $$Tp + [Wa/Ft(t)]/fo$$

where Tp is a constant integer picked randomly from a set 1, 2, 3, ..., N, where N is much larger than the typical number of nearest neighbors of Information Transmissions Cells. Wa is an integer, called transmission activation slope, and [Ft(t)] is the non-zero integer part of the output of the activation update unit 32. Transmission activation slope Wa provides the time scale of response of activation updating with regard to input from activation update unit 32. As a result of delay in pulse generation by switch 40 the average number Mp of pulses per code length Tc is $$Mp = Tc[Ft(t)].$$

The output of switch 40 is the random code $Dt(t)$ of the transmission cell 22, which is the external output of said cell. The output of switch 40 is averaged in integrator 41 to produce the output $$f(:Dt(t):)$$

where $f(z)$ is some generally non-linear gain function. The input of transmission cell 22 from common communication channel 20 is averaged by integrator 26 to produce the output $$f'(:Lt(t):)$$

where $f'(t)$ is some, generally non-linear, gain function.

The outputs of bolometer 34, integrator 41, and integrator 26 are the inputs of activation update unit 32 and its output is $$f''(:Dt(t)Lt(t):;:Lt(t):;:Dt(t):),$$

where $f''(x,y,z)$ is some non-negative, generally non-linear, function of its arguments such that as a function of its third argument it has a threshold, is monotonic, and has saturation.

Figure 5:
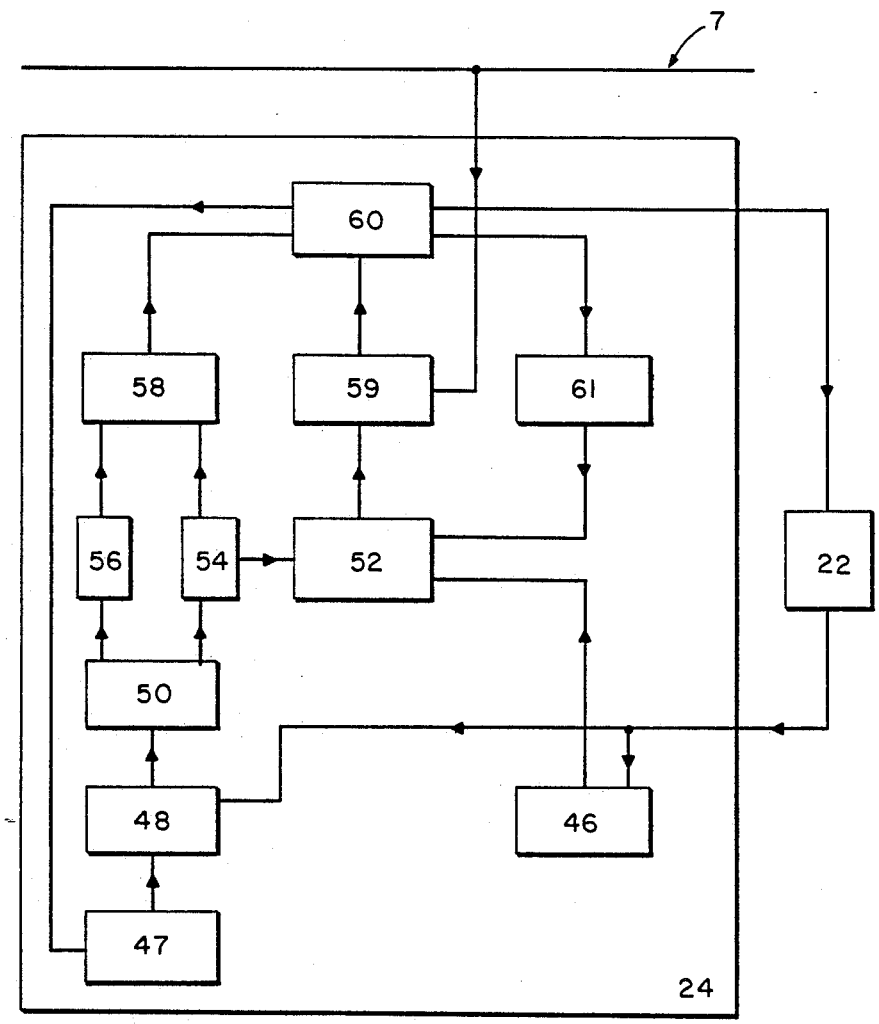
FIG. 5 is a block-diagram of a memory cell.

Referring now to FIG. 5 a block diagram of a memory cell 24 is shown. The inputs of the memory cell 24 are the random code $Dt(t)$ from transmission cell 22 and the random stream from the random code generator 3. The output of the memory cell 24 is the random code $Dm(t)$. The operation of the memory cell is identical to the operation of the transmission cell except for the difference in the learning slope constant and activation slope constants. Memory learning slope is considerably less than transmission learning slope and memory activation slope is considerably larger than transmission activation slope. As a result, the speed of the timing update of the memory cell code $Dm(t)$ is $Va/Vm$ times slower than that of the transmission cell. And the speed of the activation updating of the memory cell is $Wm/Wa$ time slower.

Memory cell 24 comprises integrators 46, 61; bolometers 54, 56; adder 58; switches 48, 50, 60; activation update unit 52; and delay units 47, 59. External information input $Lt(t)$ into the memory cell 24 comes from transmission cell 22. Said input can be represented as $$Lm(t)=TmtDt(t),$$

where $Dt(t)$ is the output of transmission cell 22 of FIG. 3 of the corresponding ITC. Constant $Tmt$ is the numerical attenuation coefficient for the information signal propagation from transmission cell to memory cell of the same ITC. Due to relative proximity of said memory cell 24 to transmission cell 22, the constant $Ttm$ is close to one.

The input $Lm(t)$ undergoes effective multiplication by the output function $Dm(t)$ of switch 60. Said function is the input of delay unit 47 which delays propagation of code pulses from switch 60 to switch 48 for time $(s/fo)$ during odd time intervals from $(nTc)$ to $(n+1)Tc$ for n odd and does not delay said propagation during even time intervals when n is even, where s is some integer number. Switch 48 opens and closes access of switch 50 to the common communication channel with transmission cell 22 during the time when the corresponding random code is one or zero, respectively. Neglecting time of propagation from switch 60 to switch 47, during said odd time intervals said code is $Dm(t-s/fo)$; and during said even time intervals said code is $Dm(t)$.

The input of switch 50 is proportional to the energy flux from transmission cell 22 multiplied by either $Dm(t-s/fo)$ or $Dm(t)$. Switch 50 directs all output of switch 48 with uniform frequency $fo$, the base clock frequency, to bolometer 56 during odd time intervals from $(nTc)$ to $(n+1)Tc$ (for n odd) and to bolometer 54 during even time intervals (for n even). The outputs of bolometers 56 and 54 are proportional to the average of the received inputs over the period of time $Tb=mTc$, where m is some large number. These outputs are related to the total energy absorbed by switch 48 during either odd or even intervals of code length $Tc$. The output of bolometer 54 is the signal proportional to the average energy flux $:E:$ into bolometer 54

$$:E:=:Dm(t)Lm(t):$$

where the average is over said time period $Tb$. The output of bolometer 56 is the signal proportional to the average energy flux $:E:$ into bolometer 56

$$:E:=:Dm(t-s/fo)Lm(t):$$

where the average is over said time period $Tb$.

Adder 58 subtracts the output of bolometer 56 from output of bolometer 54. The output $Na(t)$ of adder 58 is $$Na(t)=Vm[:(Dm(t)-Dm(t-s/fo))Lm(t):],$$

where $Vm$ is a positive integer, called memory learning slope. The net effect of memory timing updating is the implementation of the steepest ascent method for finding the extremum of the functional $$Tr=\text{SUM}q[:Lm(t)Dm(t):],$$

where the sum is over all nearest neighbors of transmission cell 22, i.e. all processors or cells which communicate with said transmission cell directly.

The output of adder 58 is the input of switch 60. It determines update of timing delay $tm(t)$ of switch 60. Switch 60 prevents emission of random stream from the delay unit 59 into communication channel with transmission cell 22 during even time intervals from $(jTc)$ to $(jTc+ti(t))$, allows said emission during intervals from $(jTc+ti(t))$ to $(jTc+ti(t)+Tp)$, and blocks said emission during intervals from $(jTc+ti(t)+Tp)$ to $((j+1)Tc)$, when j is even. Switch 60 opens prevents emission of random stream from the delay unit 59 into said communication channel during even time intervals from $(jTc)$ to $(jTc+ti(t)+s/fo)$, allows said emission during intervals from $(jTc+ti(t)+s/fo)$ to $(jTc+ti(t)+s/fo+Tp)$, and blocks said emission during intervals from $(jTc+ti(t)+s/fo+Tp)$ to $((j+1)Tc)$, when j is odd.

Random stream from Random Code Generator 3 is accessed by the delay unit 59 which, upon arrival of a positive value of said random stream generates a unit pulse of duration $1/fo$ with a delay $$Tp+[Wm/Fm(t)]/fo$$

where $Tp$ is a constant integer picked randomly from a set $1, 2, 3, \ldots, N$, where N is much larger than the typical number of nearest neighbors of Information Transmissions Cells. $Wm$ is an integer, called memory activation slope, and $[Fm(t)]$ is the non-zero integer part of the output of the activation update unit 52. Activation slope Wm provides the time scale of response of activation updating with regard to input from activation update unit 52. As a result of delay in pulse generation by switch 60 the average number Mp of pulses per code length Tc is $Mp = Tc[Fm(t)]$.

The output of switch 60 is the random code Dm(t) of the memory cell 24, which is the external output of said cell. The output of switch 60 is averaged in integrator 61 to produce the output $f(:Dm(t):)$ where f(z) is some generally non-linear gain function. The input of memory cell 24 from communication channel with transmission cell 22 is averaged by integrator 46 to produce the output $f'(:Lm(t):)$ where f'(t) is some, generally non-linear, gain function.

The outputs of bolometer 54, integrator 61, and integrator 46 are the inputs of activation update unit 52 and its output is $f''(:Dt(t)Lt(t):;:Lt(t):;:Dt(t):)$, where f''(x,y,z) is some non-negative, generally non-linear, function of its arguments such that as a function of its third argument it has a threshold, is monotonic, and has saturation.

Figure 6:
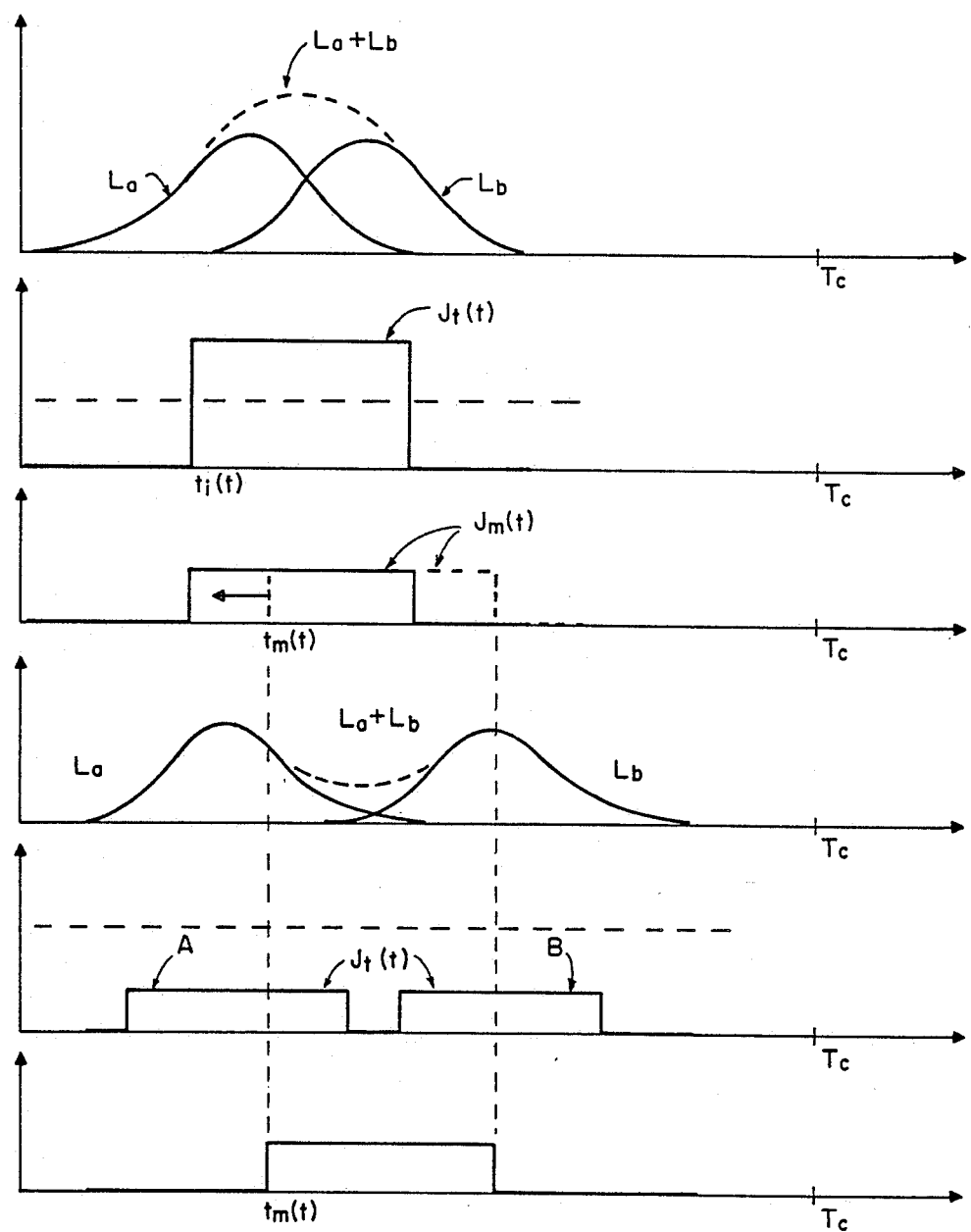
FIG. 6 illustrates timing and activation adjustments for memory and transmission cells for high external input.

Referring now to FIG. 6 updating of activations and timings of transmission cell random code density and memory cell random code density is shown for the case of good and bad match between the total signals coming from the general directions of sides A and B of FIG. 1. Graph (a) depicts the case when there is a good match, which means that the combined total input from all the directions has only one maximum. In that case timing ti(t) of the transmission cell is updated to achieve the maximum energy flux absorbed by the bolometer 34 of FIG. 4. Said updating also ensures the maximum information transmission capacity through the Information Transmission Cell. When information transmission capacity is high, so is the activation of the transmission cell. If the activation of the transmission cell is above a certain threshold the memory cell's timing is updated from tm(t) until eventually it coincides with the timing ti(t) of the transmission cell. If said combined total input exhibits two maximums than maximizing said energy flux leads to two possible solutions for timings for transmission cell random code with below threshold values of transmission cell activations. In such a case memory cell timing is not updated.

Figure 7:
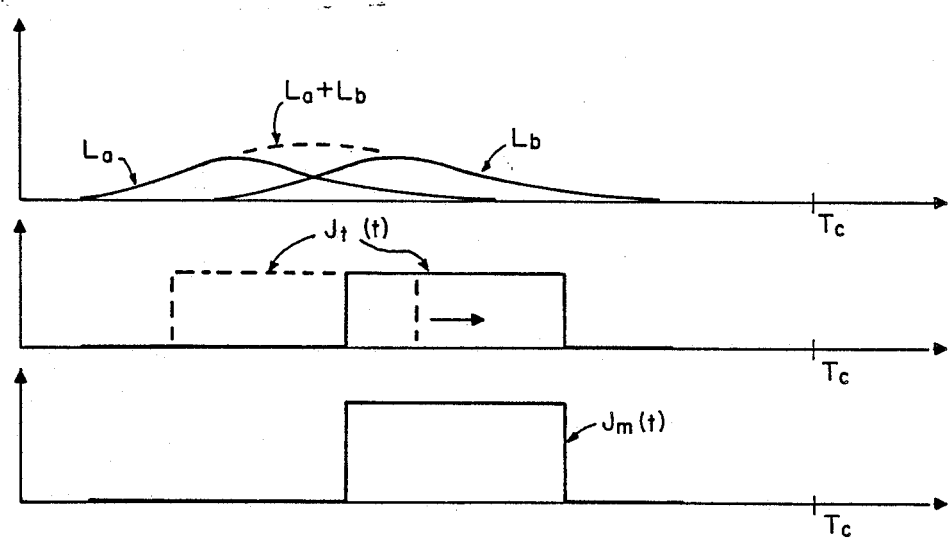
FIG. 7 illustrates timing and activation adjustments for memory and transmission cells for low external input.

Referring now to FIG. 7 an illustration of activations and timings updating is shown in the case when the total energy input of the Information Transmission Cell is low compared to the total energy output of memory cell of said ITC. If said combined total external energy input of the transmission cell is significantly less than the transmission's cell input from the memory cell, than the transmission sell and memory cell begin to update their timings so that eventually they coincide. Because the timing updating for the memory cell is considerably slower than that of the transmission cell, the total change which the transmission cell timing will undergo will be considerably more than that of the memory cell timing. As a result when the timing will become equal their final value will be close to the original timing of the memory cell.

Figure 8A:
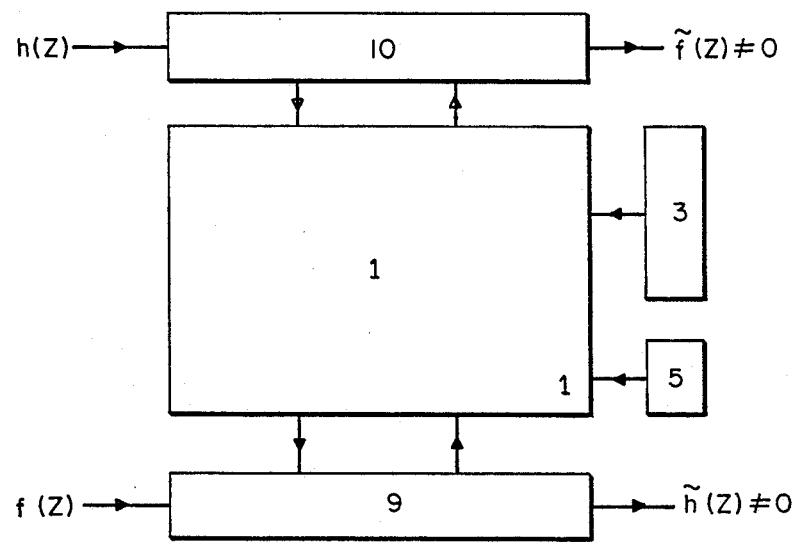
FIG. 8 illustrates training and discrimination cycles for the Information Transmission Medium.
Figure 8B:
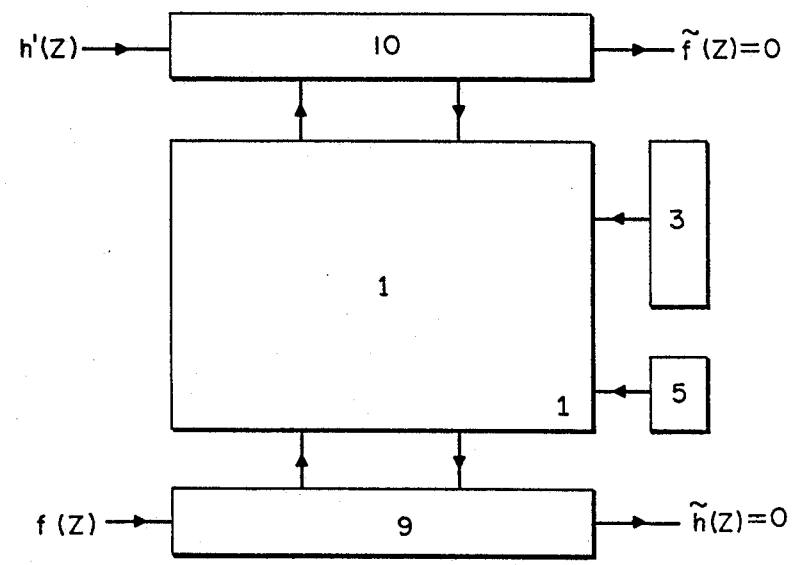

Referring now to FIG. 8 an illustration of training and discrimination cycles is shown. Training cycle consists of subjecting both sides A and B to non-zero inputs f(z) and H(z) and obtaining non-zero outputs f'(z) and h'(z). Training is completed when the maximum total heat flux is dissipated through the substrate 1 of FIG. 1. The rate of learning is measured by the bolometer 5 of FIG. 1. When said total heat flux is maximized so is the total information transmission capacity of the Variable Capacity Transmission Medium. After the completion of the training cycle discrimination of the information can be achieved by changing input on one of the sides. As long as the new input is sufficiently close to the original one the total transmission capacity will remain close to the level achieved in training. This constituted acceptance of the recognition process of the discrimination cycle. When the new input will differ from the old one sufficiently the total transmission capacity will quickly drop to zero as measured by the total heat flux trough said substrate. This constitutes rejection of the recognition process of the discrimination cycle.

I claim:

1. A method of weight adjustment in a neural network comprising an assembly of input/output processors with information transmission cells, the method comprising:

providing inputs for activations of input/output units arranged on opposite sides of a two dimensional array of information transmission cells; making said information transmission cells communicate with each other by emission and absorption of signals modulated according to random binary codes; arranging said codes to be non-zero within activation windows of a pulse length, the pulse length being within a longer code length; making said information transmission cells maximize their transmission capacity by maximizing heat emission from said information transmission cells; maximizing said heat emission by updating position of said activation windows within said longer code lengths; and measuring the total heat flux by said assembly of input/output processors and information transmission cells.

2. A random code neural network for information correlation and discrimination of plural inputs comprising:

an array of information transmission cells for receiving the plural inputs, each information transmission cell comprising a transmission cell and a memory cell, the information transmission cells communicating with each other by emission and absorption of signals modulated according to random binary codes, the binary codes from each information transmission cell being non-zero within activation windows of a pulse length, the pulse length being within a longer code length;

each transmission cell comprising means for measuring energy flux in an input and means for learning by updating timings of random code to increase the transmission capacity of the random code;

each memory cell comprising means for measuring energy flux in an input and means for learning by updating timings of random code at a speed which is low relative to the speed of updating timings in the transmission cell to increase the transmission capacity of the random code, and means for monitoring the learning of the array of information transmission cells.

3. A random code neural network as claimed in claim 2 wherein the means for monitoring measures the total transmission capacity of the array.

4. A random code neural network as claimed in claim 2 wherein the means for monitoring comprises a heat flux detector.

5. A random code neural network as claimed in claim 2 further comprising a common random code generator which supplies a random code to each information transmission cell.

6. A random code neural network as claimed in claim 2 wherein the means for updating timings to increase the transmission capacity of the random code maximizes heat emission from the information transmission cell.

* * * * *